US012293372B2

(12) United States Patent
Rojas

(10) Patent No.: US 12,293,372 B2
(45) Date of Patent: May 6, 2025

(54) SYSTEMS AND METHODS FOR DETERRING BOT ACCESS OF COMPUTER RESOURCE

(71) Applicant: AXS Group LLC, Los Angeles, CA (US)

(72) Inventor: Michael J. Rojas, North Canton, OH (US)

(73) Assignee: AXS Group LLC, Los Angeles, CA (US)

(*) Notice: Subject to any disclaimer, the term of this patent is extended or adjusted under 35 U.S.C. 154(b) by 0 days.

(21) Appl. No.: 18/475,158

(22) Filed: Sep. 26, 2023

(65) Prior Publication Data

US 2024/0273542 A1    Aug. 15, 2024

Related U.S. Application Data

(60) Provisional application No. 63/484,932, filed on Feb. 14, 2023.

(51) Int. Cl.
*G06Q 20/40* (2012.01)
*G06Q 20/02* (2012.01)
(Continued)

(52) U.S. Cl.
CPC ....... *G06Q 20/40975* (2013.01); *G06Q 20/02* (2013.01); *G06Q 20/3674* (2013.01); *G06Q 20/3825* (2013.01)

(58) Field of Classification Search
CPC ............. G06Q 20/40975; G06Q 20/02; G06Q 20/3674; G06Q 20/3825
See application file for complete search history.

(56) References Cited

U.S. PATENT DOCUMENTS 8,676,615 B2 * 3/2014 Callaghan .......... G06Q 30/0643
                                                       348/222.1
9,721,268 B2 * 8/2017 Bondesen ............... G06Q 20/36
(Continued)

FOREIGN PATENT DOCUMENTS

CN        106530033 A     3/2017
KR      10-2439879 B1     9/2022
WO    WO 2022/016280 A1   1/2022

OTHER PUBLICATIONS

Zhu et al., RealID: Building a Secure Anonymous yet Transparent Immutable ID Service, 2017, 2017 IEEE 3rd International Conference on Big Data Security on Cloud, pp. 277-280 (Year: 2017).*

(Continued)

*Primary Examiner* — John W Hayes
*Assistant Examiner* — Yingying Zhou
(74) *Attorney, Agent, or Firm* — Knobbe, Martens, Olson & Bear LLP

(57) ABSTRACT

Aspects of the present disclosure relate to receiving a request from a remote device for access to an online computer-based service, transmitting to the remote device a request for a verifiable token encoding a verifiable credential containing an issuer's digital signature signed with a private key and an identifier indicating that a holder of the verifiable credential is human. If the verifiable token was not received, access to the online computer-based service is inhibited. If the verifiable token is received, its validity is confirmed utilizing an associated public key. If the validity is confirmed, the request from the remote device for access to the online computer-based service is determined to be from a human and the remote device is enabled to access the online computer-based service.

17 Claims, 3 Drawing Sheets

(51) Int. Cl.
  *G06Q 20/36* (2012.01)
  *G06Q 20/38* (2012.01)

(56) References Cited

U.S. PATENT DOCUMENTS

| | | |
|---|---|---|
| 10,867,460 B1 | 12/2020 | Miller |
| 11,200,516 B2 * | 12/2021 | Scarborough .......... G06Q 10/02 |
| 11,533,619 B1 * | 12/2022 | Kahn ...................... G06F 21/36 |
| 11,611,552 B2 | 3/2023 | Backlund |
| 2003/0084302 A1 * | 5/2003 | de Jong ............. G06F 21/6245 |
| | | 713/172 |
| 2003/0171960 A1 * | 9/2003 | Skinner ................. G07B 15/00 |
| | | 705/5 |
| 2003/0182242 A1 * | 9/2003 | Scott ................. G06Q 30/0207 |
| | | 705/65 |
| 2004/0006497 A1 * | 1/2004 | Nestor ................... G06Q 10/02 |
| | | 705/5 |
| 2007/0043681 A1 * | 2/2007 | Morgan ............. G06Q 20/3674 |
| | | 705/67 |
| 2009/0294539 A1 * | 12/2009 | Kim .................... G06F 16/9554 |
| | | 235/462.01 |
| 2011/0282725 A1 | 11/2011 | Chatterjee |
| 2012/0214515 A1 | 8/2012 | Davis |
| 2014/0039945 A1 * | 2/2014 | Coady ................... G06Q 10/02 |
| | | 705/5 |
| 2014/0189808 A1 * | 7/2014 | Mahaffey ............ G06F 21/6245 |
| | | 726/4 |
| 2014/0240469 A1 | 8/2014 | Lee |
| 2014/0279615 A1 | 9/2014 | Levin et al. |
| 2015/0032627 A1 * | 1/2015 | Dill .......................... H04L 9/32 |
| | | 705/44 |
| 2015/0332029 A1 * | 11/2015 | Coxe ...................... G06F 21/31 |
| | | 726/5 |
| 2016/0078370 A1 * | 3/2016 | McEwen .............. G06Q 20/405 |
| | | 705/5 |
| 2017/0012138 A1 | 1/2017 | Suzawa et al. |
| 2018/0322597 A1 * | 11/2018 | Sher ...................... G06Q 50/163 |
| 2018/0336336 A1 | 11/2018 | Heikell |
| 2019/0334905 A1 * | 10/2019 | Lelcuk .................... G06F 21/36 |
| 2019/0370493 A1 * | 12/2019 | Deutschmann ..... H04L 63/0861 |
| 2020/0143022 A1 * | 5/2020 | Frost .................. H04L 63/0869 |
| 2020/0177560 A1 * | 6/2020 | Todd ................... H04L 63/0435 |
| 2020/0366680 A1 * | 11/2020 | Lelcuk .................... G06F 21/36 |
| 2021/0090082 A1 * | 3/2021 | Cohen ...................... G07C 9/27 |
| 2022/0321354 A1 | 10/2022 | Ladd et al. |
| 2024/0046265 A1 * | 2/2024 | Woo .................... G06Q 20/3674 |

OTHER PUBLICATIONS

Karaiskos et al., "User Acceptance of Pervasive Information Systems: Evaluating an RFID Ticketing System", ECIS 2007 Proceedings. 4, retrieved from https://aisel.aisnet.org/cgi/viewcontent.cgi?article=1192&context=ecis2007 (Year: 2007).
PCT International Search Report regarding International Application No. PCT/US2024/010856, mailed May 7, 2024, 10 pages.

* cited by examiner

SYSTEMS AND METHODS FOR DETERRING BOT ACCESS OF COMPUTER RESOURCE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Field

The present disclosure generally relates to systems and methods for securely determining whether an entity accessing a networked resource is a human (rather than an automated program).

Description of the Related Art

As networked computer resources have become ever more critical, there has been a commensurate rise in the use of automated programs (e.g., bots) to improperly access such networked computer resources.

Conventional attempts to solve the technical and other challenges presented by automated programs improperly accessing such networked computer resources have not provided satisfactory solutions.

For example, conventionally, websites may utilize CAPTCHA (Completely Automated Public Turing test to tell Computers and Humans Apart), a type of security measure known as challenge-response authentication, in an attempt to prevent a bot from accessing a website service. However, CAPTCHA can be time consuming and challenging for humans. In addition, more sophisticated automated programs are configured with artificial intelligence functionality which enables them to successfully respond to the CAPTCHA challenge.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1A:
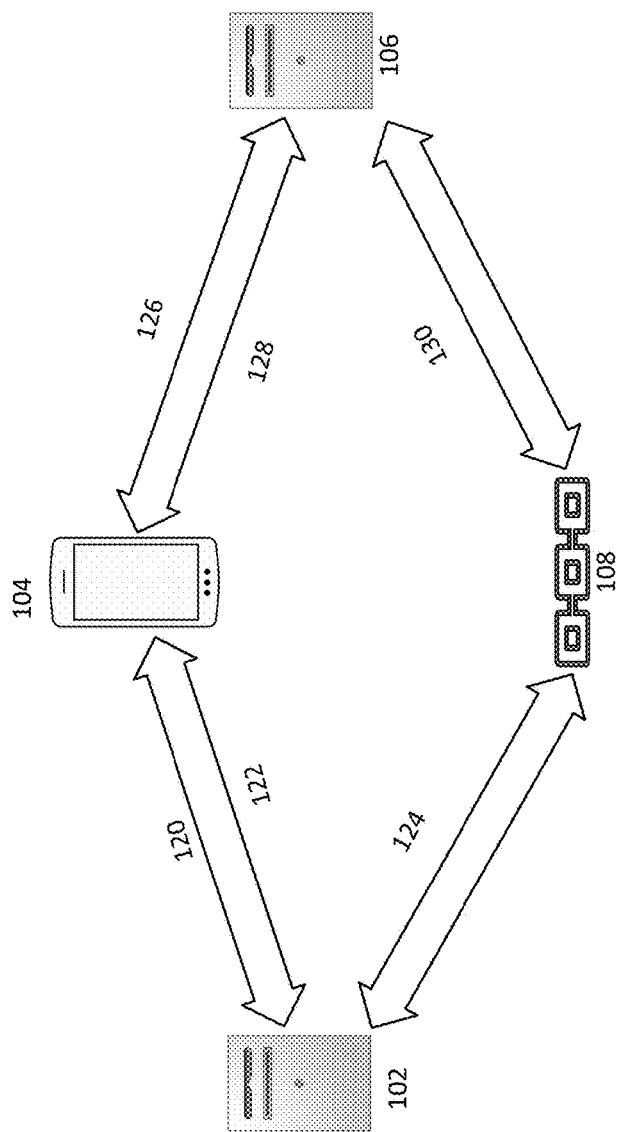
FIG. 1A illustrates an example networked environment architecture.

Systems and methods are described to accurately and efficiently determine whether a user attempting to access a computer resource is a human or a bot (an autonomous program configured to interact with systems or users over a network, such as the Internet).

As services and products are increasingly offered over networks, such as the Internet, there has been a corresponding increase in the use of bots in attempting the misuse and improper acquisition of services and products.

For example, event tickets (entitling users to attend a ticketed event and in some instances, utilize a particular assigned seat), which by their nature are limited in quantity, are often purchased in bulk using large numbers of high-speed ticket bots operated by scalpers. Indeed, large percentages of tickets are purchased online by automated software, in order to be resold later at a much higher price than the face value. The use of such automated software deprives consumers of the opportunity to purchase tickets at face value. In addition, such automated software can overwhelm the ticket servers selling such tickets, providing slowed responses to legitimate consumers, and requiring that ticket sites utilize ever increasing amounts of computer resources in an attempt to manage the heavy load of ticket requests.

Conventional attempts to solve the technical and other challenges presented by ticket bots, including legislation and technical approaches, have not provided satisfactory solutions.

For example, as similarly discussed above, conventionally, ticket websites may utilize CAPTCHA (Completely Automated Public Turing test to tell Computers and Humans Apart), a type of security measure sometimes referred to as challenge-response authentication. However, responding to CAPTCHA challenges can be time consuming and challenging for humans, often involving multiple attempts to satisfactorily respond to the CAPTCHA challenges. In addition, more sophisticated bots are configured with artificial intelligence functionality which enables them to successfully respond to the CAPTCHA challenge.

Thus, what is needed is a technical solution that can accurately determine when an entity accessing a network resource is actually a human and not a bot.

An aspect of the present disclosure relates to the use of decentralized identifiers to determine if an entity accessing a computer resource, such as an event ticketing website or other online service, is a human or a bot. Optionally, the entity does not have to log in to an account with the ticketing website (although the entity may log in to a user's account) or solve a CAPTCHA in order to access the computer resource, but rather is verified as a human using a verifiable certificate comprising a decentralized identifier.

An aspect of the present disclosure relates to a decentralized identifier that comprises a verifiable, decentralized digital identity associated with a human. Advantageously, the decentralized identifier is optionally decoupled from certificate authorities (so that the identifier cannot be revoked by such a certificate authority), centralized registries, and/or identity providers. Thus, optionally, the decentralized identifier architecture enables a controller of the decentralized identifier to prove control over the decentralized identifier without requiring permission from a third party certification entity (although optionally other entities may be utilized to assist in accessing data related to the decentralized identifier). The decentralized identifier may optionally comprise a namespace component that identifies a decentralized identifier method, and a decentralized identifier method specification specifies the format of the method-specific identifier. Optionally, the decentralized identifier identifies the holder as being a human (not an automated program), but does not provide the identity (e.g., name or other personal identifier) of the human.

Optionally, the decentralized identifier may comprise a uniform resource identifier (e.g., a Uniform Resource Locator (URL)) that associates a subject (e.g., a human) with a decentralized identifier document enabling trustable interactions associated with the human. By way of example, the decentralized identifier document (which may optionally be fully self-describing) may comprise a set of data describing the human, optionally including cryptographic public keys, that a human (or a delegate) can use to authenticate herself/himself and prove his/her association with the decentralized identifier (although the decentralized identifier may indicate that the holder is a human, without providing the identity of the holder). The decentralized document may include proof purposes, verification methods, and service endpoints. For example, a document may specify that a particular verification method, such as a cryptographic public key or pseudonymous biometric protocol, can be used to verify a proof that was created for the purpose of authentication. The service endpoints may be utilized to enable trusted interactions with a decentralized document controller".

In particular, the decentralized identifier document may comprise the decentralized identifier itself, a set of cryptographic material, such as public keys, that can be used for authentication or interaction with the decentralized identifier subject, a set of cryptographic protocols for interacting with the decentralized identifier subject (e.g., an authentication and capability delegation), a set of service endpoints that describe where and how to interact with the decentralized identifier subject, timestamps, and/or a signature (which may optionally be used to verify the integrity of the decentralized identifier document, such as a JSON-LD identifier). Thus, a decentralized identifier (DID) may be a globally unique reference linking to a decentralized identifier document and may be in the form did:<DID method>:<method-specific identifier>, where the DID method (a specific description of how a DID is resolved in a particular blockchain (e.g., distributed ledger) or peer-to-peer network and how DID documents are written and updated) comprises a reference to a specific distributed ledger or network (e.g., a blockchain) and the method-specific identifier allows the DID to be resolved within that reference. Thus, given a decentralized identifier, the referenced decentralized identifier document may be retrieved.

The DID may be part of a verifiable certificate. A verifiable credential may comprise a machine-readable credential that is cryptographically secure and privacy-respecting. A verifiable credential may linked to an identity. The verifiable credential may optionally be stored off-chain in a user's digital wallet, signed with the issuer's decentralized identifier stored on the blockchain. Because the verifiable credential is not stored on the blockchain, the user's security and privacy is further enhanced. The verifiable credential may be encoded as a token (e.g., a JSON Web Token), containing the issuer's digital signature (signed with the issuer's private key), to thereby provide a DID token that enables easy verification. The issuer's public DID and associated public key may also be stored on the blockchain.

The decentralized identifier may optionally be pairwise-pseudonymous, to thereby act as a private identifier, issued on a per-relationship basis. Thus, rather than utilizing a single decentralized identifier with multiple services (e.g., websites), optionally, a decentralized identifier may only be used with a single service (e.g., a ticketing website). Optionally, the decentralized identifier token may be a one-use DID token and/or a time-limited DID token (e.g., where the decentralized identifier token is only valid for a specified period of time, such as 5 minutes, 10 minutes, 15 minutes, or somewhere in the range of 3 minutes to 60 minutes) to inhibit the holder sharing the DID token with others who may want to represent themselves as the holder (or as a human generally).

Optionally, a person/user may hold a certificate signed by the DID token which may optionally be stored in a digital wallet of the user that is under the user control. A certificate issuer may vouch for the authenticity of the certificate. Optionally, the certificate does not identify the identity of the person/user to a recipient/verifier of the certificate, but instead identifies the holder of the certificate as being human without providing the holder's identity (e.g., without providing a name, email address, and/or other personally identifying information). Optionally, rather than (or in addition to) storing the certificate in a wallet, the user may provide the certificate to the verifier via an application downloaded to a user device substantially immediately after the certificate is generated (within 5 minutes, 10 minutes, 15 minutes, 30 minutes or 60 minutes of the certificate being generated). For example, the application (e.g., may be referred to as a ticketing application) may be associated with an event ticket entity and may be used to search for and acquire event tickets. Optionally, a user does not need to have an account with the event ticket entity in order to use the application for generating or receiving a certificate.

For example, an issuing authority (e.g., a trusted issuing authority) may issue a certificate comprising a certified decentralized identifier to a holder (e.g., a consumer, a citizen, other entity), digitally signed by the issuer. By way of illustration, the issuing authority may be a government entity, a credit bureau, a third party authentication service (e.g., a biometric authentication service), and/or the like. Optionally, the issuing authority may also act as a verification authority. Optionally, the issuing authority may validate the identity and/or humanness of an entity, and issue an identifier of a single attribute (or multiple attributes) of the holder, signed by the issuer. For example, the issuer may present a set of challenge questions (which would be difficult or impossible for an automated program to answer correctly) to an entity requesting that the issuing authority issue a certificate, and the entity needs to correctly answer a threshold number/percentage of questions in order to be verified as human, where the issuer has the answers to the questions. For example, the questions may ask the entity for data that is personal to the human the entity is purporting to be. By way of example illustration, questions may relate to a mortgage held by the human (e.g., who is the mortgage with, how large is the mortgage, when was the mortgage taken, etc.). By way of further illustration, questions may relate to what ticketed events the human has attended. By way of still further illustration, questions may relate to the human's employment (e.g., where are you currently working, what is your job title, when did you begin working there, etc.). By way of further example, the issuer may ask that the entity perform certain tasks that would be difficult for an automated program to perform.

If the entity is verified as human (in response to the entity correctly answering the threshold number of challenge questions), then the issuing authority may issue a verifiable "humanness" certificate comprising a decentralized identifier to the user. The issuer of the credential attests that the proof the user provided is accurate and creates a verifiable credential signed with their DID for which the user's DID is the subject. The DID may be configured to personally identify the user or the DID may be configured to indicate that the user is a human without personally identifying the user.

The decentralized identifier may be stored in a digital wallet associated with the holder. The digital wallet may be in the form of a wallet application downloaded to a user device (e.g., a mobile device, such as a smartphone). The digital wallet may be part of a ticketing application. The digital wallet application may provide encryption for personal data and/or for transactions involving items (e.g. identifiers, private keys, and/or other items) stored in the digital wallet.

Optionally, the digital wallet may be stored on a server and accessed via a browser hosted on a user device. Optionally, in addition to the decentralized identifier, the digital wallet may store digital currency (e.g., cryptocurrency/cryptocurrency private keys) and/or other financial instruments that may be utilized for financial transactions.

The digital wallet may optionally store (e.g., on the client side and/or the server side) user information (e.g., provided by the user and/or populated from another data source). User information may include, by way of example, a mailing address, a billing address, a mobile phone number, payment instrument data (e.g., credit and debit card numbers, expiration dates, security codes, and/or the like), and other information.

The holder may utilize the decentralized identifier to obtain goods and/or service from a verifier (e.g., a ticketing website, an online ecommerce store, a government entity, etc.). By way of illustration, the holder/user may utilize a decentralized identifier stored in the digital wallet to verify that the holder is human in order to purchase tickets (e.g., event tickets that entitles a user to access a venue and attend an event, such as a concert, sporting event, play, movie, and/or other event, and that may entitle a user to utilize a specific seat at the venue) from a ticket source, such as a ticketing website.

For example, when a user/holder of a decentralized identifier wishes to purchase a ticket from a ticketing website, the digital wallet may transmit a secure, digital, one-time use verifiable token signed with the user's/holder's decentralized identifier, that optionally may only be utilized to verify the authenticity of the holder (and thereby determine that the holder is human) and that the identifier is valid and in good standing. The verifiable token may in addition or instead have a time-limited life (e.g., where the decentralized identifier is only valid for a specified period of time, such as 5 minutes, 10 minutes, 15 minutes, or somewhere in the range of 3 minutes to 60 minutes). Thus, by having the token limited to a one-time use and/or a limited time period, the holder is inhibited from successfully sharing the token with others who may want to represent themselves as the holder (or as a human generally).

By way of illustration, when a user accesses a ticketing webpage for an event and initiates a ticket selection and/or purchase process, the ticketing website may present an optical code (e.g., a QR code or other barcode-type) comprising a link on a first device of the user. Optionally, the optical code includes a timestamp. Optionally, the optical code periodically refreshes (e.g., every 1 minute, 3 minutes, 5 minutes, or other time period) with a new optical code (optionally, including a new timestamp), wherein the optical code with a given timestamp is not valid once a new optical code is generated to thereby prevent a screenshot from being used in the following process. The user may scan the optical code using a camera on a second device of the user (e.g., a mobile phone camera), where the user device may also host the digital wallet storing the certificate of humanness (e.g., corresponding to the decentralized identifier), wherein the certificate may be bound to a unique digital wallet identifier. In response to the user activating a notification presented in response to the scanning of the optical code, the user device may transmit the decentralized identifier and/or a verifiable credential to the ticketing system (e.g., encoded in a verifiable token). Optionally, rather than capturing an image of the optical code using a camera, a copy operation may be performed on the user device presenting the optical code (e.g., in response to a user activation of a copy control). The user may paste/copy the code into a receiving field of an application (e.g., the wallet, which may be part of the ticketing application), which in turn may transmit the decentralized identifier and/or a verifiable credential (e.g., encoded in a verifiable token) to the ticketing system. Optionally, rather than using an optical code in the foregoing process, an alphanumeric code may be presented and used.

The unique digital wallet identifier may be signed using a private key, optionally secured by a biometric proof (e.g., a facial fingerprint, or a finger fingerprint) and/or a PIN code that only the holder (or holder delegate) knows. A uniquely paired public key may be published to (recorded on) a distributed ledger comprised of a synchronized distributed database or one or more or peer-to-peer networks. Thus, if an entity attempts to utilize the certificate with a different digital wallet (which will have a different wallet identifier than the one to which the certificate is bound), the certificate verification will fail. For example, if a user attempts to lend their certificate comprising a decentralized identifier to a friend, where the friend stores the certificate in their wallet, the friend's use of the certificate will fail validation. Similarly, if a user loses their mobile device with their digital wallet stored thereon, the user may need to re-download a digital wallet application to a new mobile device (which will have a new unique digital wallet identifier), and may need to obtain a new verifiable certificate of humanness (e.g., a verifiable credential) from the issuer. Thus, multiple techniques may be used singly or in combination to inhibit the use of a token by a person other than the holder (e.g., by having the token bound to the holder's wallet, by having the token be a one-use token, by having the token have a time-limited life).

Advantageously, the blockchain acts as a verifiable data registry that is open and decentralized. Hence, the use of a public blockchain obviates the need to store identifiers in centralized registries. When a party (e.g., a ticketing service) wants to confirm the validity of a decentralized identifier, that party can look up an associated public key on the blockchain rather than requiring third parties to authenticate.

In particular, the optical code (or alphanumeric code) may optionally comprise a specific request for a verifiable certificate of humanness (a verifiable credential of humanness). Optionally, a certificate verification request may be presented via the user's mobile device (e.g., in association with an approve or other permission control). In response to the user activating a corresponding control, the public key may be transmitted from the user device to the ticketing system server. The ticketing system may then validate the credential by matching it against the public key recorded on the distributed ledger. The public key identifies the account's controller, while the private key can sign and decrypt messages. Thus, the Public Key Infrastructure may be utilized to provide proofs used to authenticate entities and prevent impersonation and use of fake identities, using cryptographic signatures to verify claims.

Optionally, if the validation fails (e.g., because a user is attempting to utilize a friend's personal identifier), the issuer can instantly revoke the certificate of humanness, thereby preventing abuse of such certificates.

Because automated programs will not have such certificates of humanness, they will not be able to improperly reserve and/or purchase tickets.

Optionally, the ticketing purchase process may include a virtual waiting room. For example, if a user accesses a certain ticketing webpage for an event whose tickets have not yet gone on sale, the user may be placed in a virtual waiting room. By way of illustration, a virtual waiting room may open a specified period of time (e.g., 30 minutes or 60 minutes) prior to the ticket on-sale begins. Optionally, a CAPTCHA may be utilized as an initial filter of ticketing bots. Even if not totally effective, this technique will reduce the size of a queue for ticket requests once the on-sale begins (as certain bots may be filtered out if they are unable to solve the CAPTCHA), and will reduce the number of requests for humanness certificates, hence reducing the loading on the ticketing system and the network. Then, once the on-sale begins, those remaining in the virtual waiting room may be requested to provide a humanness certificate as described above.

Optionally, if a user does not have humanness certificate, they still may be permitted to purchase a ticket, but they may be provided with a degraded queue position (e.g., their ticketing request may be placed further down in a ticketing queue than ticketing requests that were submitted at a later time, but that were associated with verified humanness certificates).

Certain aspects will now be described with reference to the figures.

Referring now to FIG. 1A, an example networked architecture and associated processes are illustrated. The illustrated networked architecture comprises an issuer authority system 102, a holder device 104, a verifier system 106, and a distributed synchronized database 108 (e.g., a distributed ledger, such as a blockchain, utilizing large numbers of dispersed servers) and/or or peer-to-peer networks. Optionally, the issuer authority system 102 and the verifier system 106 are the same system.

By way of example, the issuer authority system 102 and/or the verifier system 106, may each include one or more servers. The issuer authority system 102 and/or the verifier system 106 may optionally comprise a cloud-based system including a hosted computing environment that includes a collection of physical computing resources that may be remotely accessible and may be rapidly provisioned as needed. Further, the issuer authority system 102 and/or the verifier system 106 may include or utilize a hosted storage environment that includes a collection of physical data storage devices that may be remotely accessible and may be rapidly provisioned as needed (sometimes referred to as "cloud" storage). Such cloud storage may be utilized to store some, or all of the data, programs, and/or content described herein. Some or all of the data stored therein may be encrypted. The various systems/devices may communicate with each other over one or more networks, such as the Internet, other wide area, local area, or other networks.

The holder device 104 may comprise a mobile device, such as a mobile phone, a tablet computer, a networked wearable device (e.g., a networked smart watch, glasses (e.g., a virtual reality or augmented reality headset), a handheld game console, or other mobile computerized device. By way of further example, the holder device 104 may comprise a desktop computer, a networked television, or other computer system. As similarly discussed elsewhere herein, the holder device 104 may host a digital wallet application which may be associated with a unique digital wallet identifier. The holder device 104 may include a display (e.g., a touch screen), configured to display user interfaces among other content, a speaker, a microphone, one or more cameras, one or more network interfaces (e.g., a cellular modem, a Wi-Fi interface, a BLUETOOTH interface and/or the like)

At state 120, the holder device 104 (sometimes referred to as a user device) may issue a request to the issuing authority system 102 for a decentralized identifier and/or a verifiable credential unique identifier. For example, the holder device 104 may receive a communication (e.g., an email or messaging service message) comprising a link, which when activated, causes the holder device 104 to issue the request for the decentralized identifier and/or a verifiable credential unique identifier to the issuing authority system 102. By way of example, the issuing authority may comprise a trusted third party authentication system (e.g., a governmental service or a private service, such as a credit bureau or a dedicated authentication service).

The issuing authority system 102 may authenticate that the entity operating the holder device 104 is a human and not an automated program. For example, the issuing authority system 102 may pose one or more challenge questions that would be difficult or impossible for an automated program to answer in a manner that appears to be human. By way of illustration, the questions may be about a very recent news event or require a great deal of creativity to answer. By way of illustration, the question may be in the form of a linguistic riddle (what is black and white and red [read] all over? A newspaper). By way of further example, the questions may be in the form of an absurd question that an automated program may find difficult to determine is absurd. By way of further example, a challenge question may be in the form of a question regarding a well known story (without identifying the store) that an automated program is unlikely to be able to answer (e.g., "what color hood was the girl wearing when the wolf spotted her By way of further example, a challenge question may ask for data that is personal to the human the entity is purporting to be. By way of example illustration, questions may relate to a mortgage held by the human (e.g., who is the mortgage with, how large is the mortgage, when was the mortgage taken, etc.). By way of further illustration, a challenge question may be in the form of a question regarding what ticketed events the human has attended. By way of still further illustration, the challenge question may be in the form of a question regarding the human's employment (e.g., where are you currently working, what is your job title, when did you begin working there, etc.). In order for the issuing authority to certify the entity as human, the entity may need to answer a threshold number of challenge questions correctly (e.g., all the questions, or less than all the questions, such as 4 out of 5 questions, 7 out of 10 questions, or other threshold number or percentage of questions).

If the entity was authenticated as a human, then at state 120, then at state 122, the decentralized identifier may be transmitted to the holder device 104. The holder device 104 may automatically or in response to a user instruction store the decentralized identifier in the digital wallet. A verifiable credential, associated with the user's decentralized identifier and signed using a decentralized identifier associated with the issuing authority, and comprising cryptographically verifiable claims made by the issuer (e.g., that the user is a human), may likewise be issued by the issuing authority system 102 and stored in the digital wallet.

When the user wants to access an online service (e.g., a ticketing service that sells tickets to events), at state 126, the user may access the online service provided by verifier system 106 (e.g., a ticketing system). For example, the user may access a website of the online service via a browser or application hosted on the device 104. The verifier system 106 may transmit an optical code (e.g., a QR code or other optical code) to be presented via the device 104. The optical code may comprise, as a link, a request for the decentralized identifier and/or the verifiable certificate. The user may point the device 104 camera at the optical code, and in response, a notification may be presented on the device's display. If the user activates (e.g., taps, clicks on, or otherwise selects) the notification, the link may be activated.

At state 128, the device 104 may access the decentralized identifier and/or the verifiable certificate to the verifier system. For example, the device 104 may transmit a one-time use verifiable token signed with the user's/holder's decentralized identifier, that optionally may only be utilized to verify the authenticity of the holder (and thereby determine that the holder is human) and that the identifier is valid and in good standing. For example, the verifiable credential may be encoded as a token (e.g., a JSON Web Token), containing the issuer's decentralized identifier as a digital signature. The verifier system 106, may confirm the validity of the decentralized identifier, by looking up an associated public key on the blockchain 108. If the verifier system 106 confirms the validity of the decentralized identifier, the verifier system 106 may correspondingly determine that the user is a human and not an automated program. The verifier system 106 may then enable the user, via the device 104, to access ticketing services and to purchase tickets.

If the verifier system 106 fails to confirm the validity of the decentralized identifier, the verifier system 106 may correspondingly determine that the user is actually an automated program and not a human and not an automated program. The verifier system 106 may then deny the device 104 access to certain ticketing services, such as the reservation and/or purchase of tickets. Optionally, in addition, if the verifiable certificate and/or decentralized identifier are revocable, the verifier system 106 may transmit a request to the issuing authority system 102 to revoke the verifiable certificate and/or decentralized identifier.

Figure 1B:
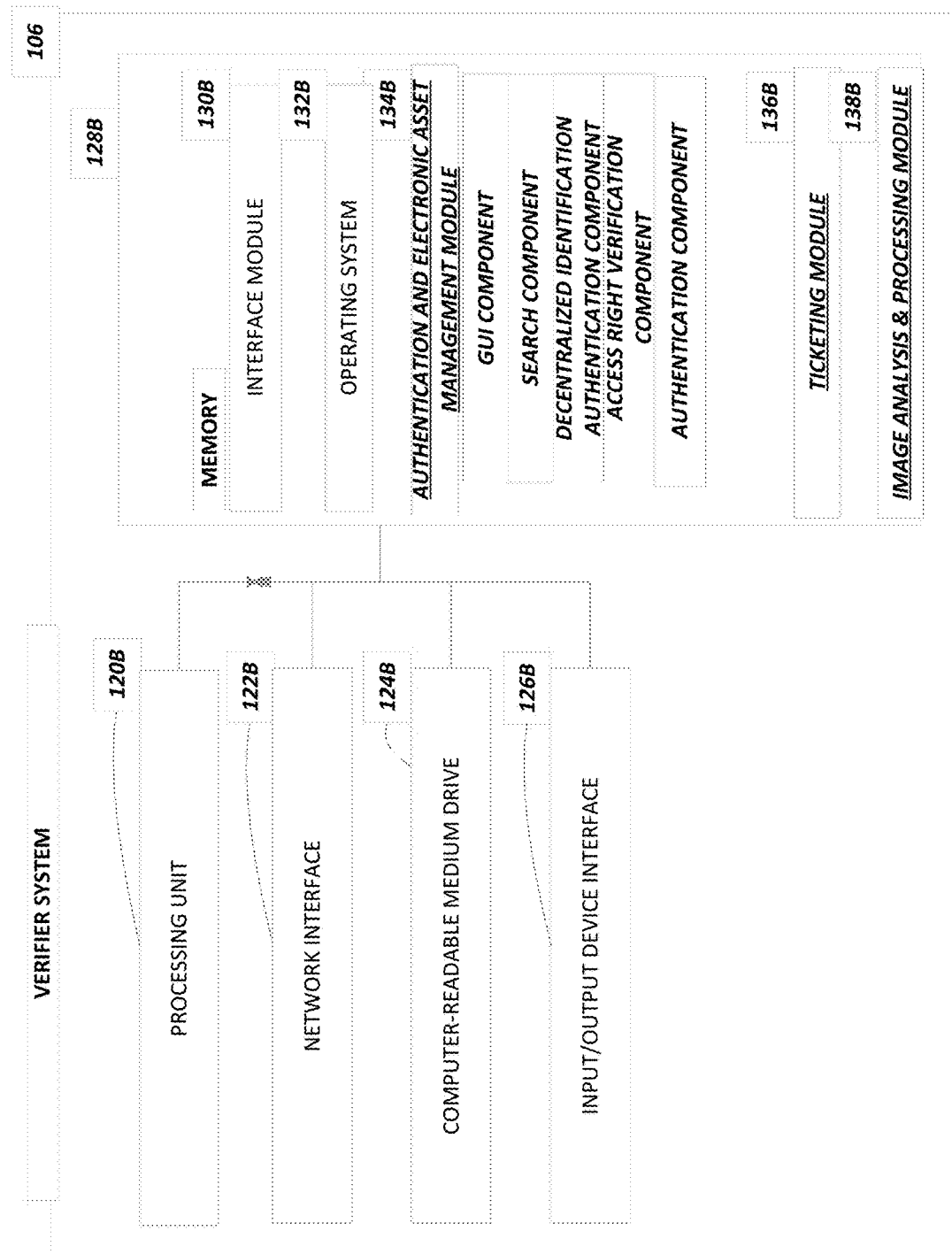
FIG. 1B illustrates an example system architecture.

FIG. 1B is a block diagram illustrating example components of the verifier system 102. The example verifier system 102 includes an arrangement of computer hardware and software components that may be used to implement aspects of the present disclosure. Those skilled in the art will appreciate that the example components may include more (or fewer) components than those depicted in FIG. 1B. The verifier system 102 may comprise a cloud-based computer system.

With respect to the cloud-based computer system, the cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage).

The verifier system 102 may include one or more processing units 120B (e.g., a general purpose processor and/or a high speed graphics processor), one or more network interfaces 122B, a non-transitory computer-readable medium drive 124B, and an input/output device interface 126B, all of which may communicate with one another by way of one or more communication buses. The network interface 122B may provide services described herein with connectivity to one or more networks or computing systems (e.g., venue systems, user device, distributed ledgers, event promoters, seating chart visualization systems, etc.). The processing unit 120B may thus receive communications (e.g., ticket service requests, verified tokenized credential al and/or distributed identifiers, verification/authentication data, verification/authentication requests, etc.) and instructions from other computing devices, systems, or services via a network, and may provide responsive data and/or execute instructions. The processing unit 120B may also communicate to and from memory 124B and further provide output information via the input/output device interface 126B. The input/output device interface 126B may also accept input from one or more input devices, such as a keyboard, mouse, digital pen, touch screen, microphone, camera, etc.

The memory 128B may contain computer program instructions that the processing unit 120B may execute in order to implement one or more aspects of the present disclosure. The memory 128B generally includes RAM, ROM (and variants thereof, such as EEPROM) and/or other persistent or non-transitory computer-readable storage media. The memory 128B may store an operating system 132B that provides computer program instructions for use by the processing unit 120B in the general administration and operation of an authentication and electronic asset management module 134B, including its components.

The memory 128B may store user accounts, including a user name, a user email address, a user phone number/SMS/text messaging address, other electronic destinations, geographical information (e.g., physical address, zip code, city, etc.) a unique user identifier (e.g., an alphanumeric identifier, fingerprint data, face print data, iris print data, and/or the like), a unique user device identifier, event identifiers corresponding to events the user has access rights to, hashes of user device and/or user identifiers, user preferences (e.g., favorite performers, favorite venues, favorite musical styles, other preferences discussed herein, and/or the like), payment instrument data, and/or other user data described herein.

The memory 128B may store may also store event, access token (e.g., ticketing), and venue information, such as discussed elsewhere herein. The memory 128B may store in a user record access rights (e.g., event tickets) owned by the user (e.g., purchased by or transferred to the user).

Some or all of the data and content discussed herein may optionally be stored in a relational database, an SQL database, a NOSQL database, or other database type. Optionally, the memory 128B may include one or more third party cloud-based storage systems.

The authentication and electronic asset management module 134B may include a GUI component that generates and/or populates graphical user interfaces and processes user inputs, and a search component (which may include a search engine used to search for ticketed events). The authentication and electronic asset management module 134B may also include a component configured to perform decentralized identifier authentication in order to determine if a user is a human or an automated program (e.g., a ticketing bot). As discussed elsewhere herein, the determination may be made using a token received from a user device, and using information in the token to retrieve data from a distributed ledger (e.g., a blockchain) or elsewhere.

If a user wants to access a user account, authentication may be performed by an authentication component via a user identifier and a user password or passkey, biometrics, multifactor authentication, and/or otherwise.

An access right verification component may be configured to authenticate a user at a venue via data provided via a mobile device of the user. For example, an application downloaded to and hosted by the mobile device, may transmit wirelessly or present on a user device display via an optical code a unique user identifier and a unique mobile device identifier (which may be encoded into a barcode (e.g., a one dimensional or two dimensional barcode, such as a QR code). The access right verification component may perform authentication of the user by comparing a hash of the unique user identifier and the unique device identifier with that generated by the verifier system 102. By way of further example, the authentication may be performed by decrypting data (e.g., using a private key or the key used to perform encryption) comprising a unique user identifier and a unique device identifier, and comparing the decrypted data with that stored by the verifier system 102. As similarly discussed elsewhere herein, optionally Advanced Encryption Standard (AES), a symmetric encryption algorithm that encrypts fixed blocks of data (of 128 bits) at a time, may be used. By way of further example, optionally Rivest-Shamir-Adleman (RSA) encryption/decryption techniques may be utilized. By way of yet further example, optionally triple DES (Data Encryption Standard) encryption/decryption techniques may be utilized. By way of yet further example, a hash function may be utilized. Optionally, in addition or instead, authentication may be performed using biometric readings of a user.

The access right verification component may be configured to determine whether an authenticated user has an associated right to access an event at a venue (and/or a portion of an event venue (e.g., by accessing a record associated with the user and determining if an issuance of a ticket to the event has been obtained by the user).

A ticketing module 136B may be configured to enable users to view information regarding ticketed events, access event venue seating charts, view available and unavailable event venue seats, access images of a view from a given seat, view access token prices, create a user account (optionally including some or all of the user account information discussed herein), purchase or otherwise obtain one or more access rights (e.g., access tokens) to the event, store an indication of access rights obtained by the user (e.g., purchased by the user, transferred to the user, lent to the user), store an indication of access rights transferred or by the user to another person, and/or recommend events to the user (e.g., using the user's preferences, access token acquisition history, geographical location, event sponsorship, and/or the like).

An image analysis and processing module 138B may be configured to perform image analysis (e.g., on optical indicia encoding encrypted authentication data), perform contrast enhancement, deblurring, and/or image rotation to thereby enhance the decoding and decryption of images of optical indicia (e.g., barcodes captured using a camera device).

The memory 128B may include an interface module 130B. The interface module 130B can be configured to facilitate generating one or more interfaces through which a compatible computing device may send to, or receive from the authentication and electronic asset management module 134B and ticketing module 136B, data and content.

Figure 2:
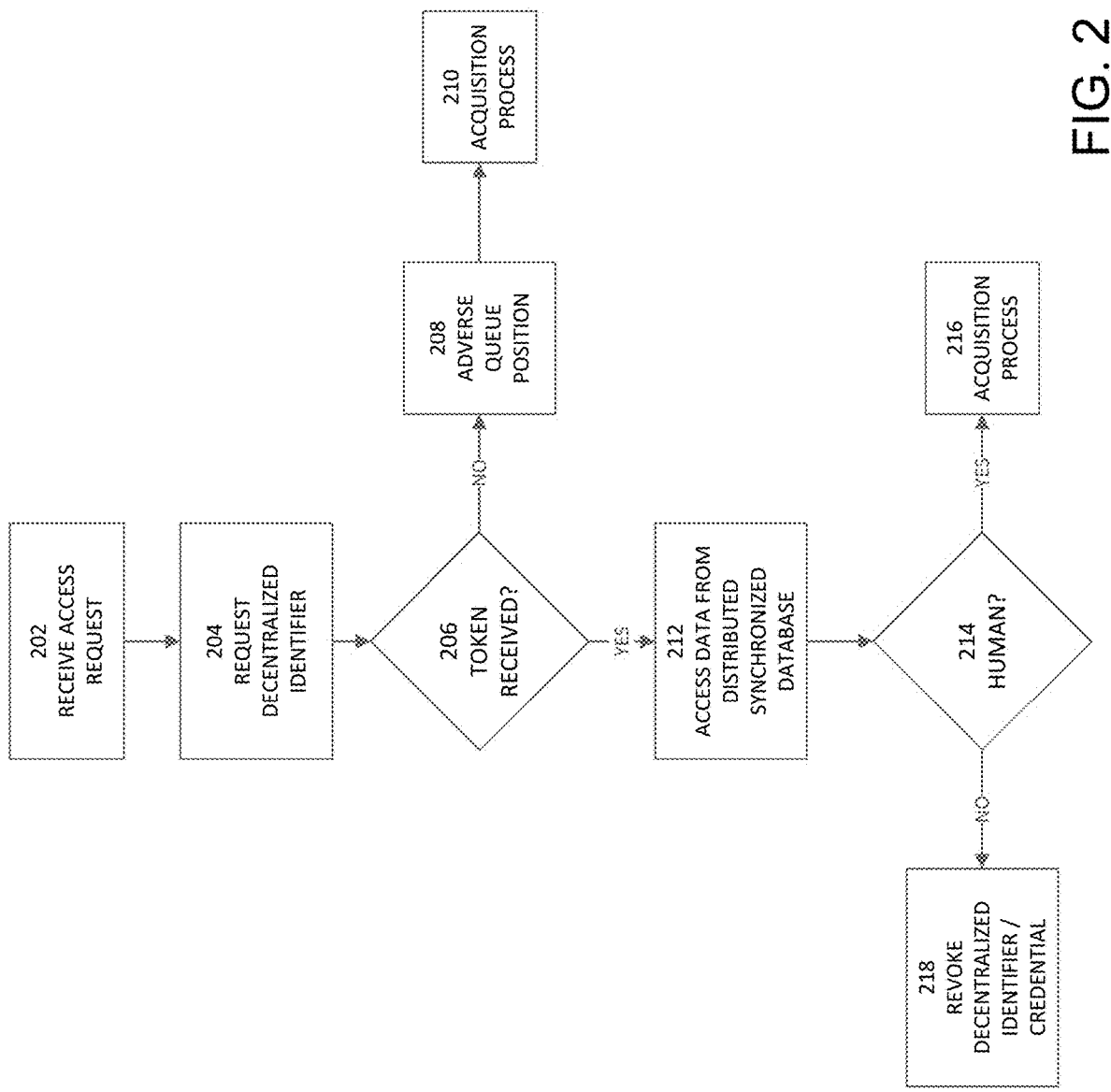
FIG. 2 illustrates an example process.

FIG. 2 illustrates an example process. The process may be executed using one or more systems disclosed herein (e.g., a user/holder device, a verifier system (e.g., a ticketing system) an issuer system, a distributed synchronized database (e.g., a blockchain), and/or a peer-to-peer network).

At block 202, an access request is received. For example, the access request may be received from a browser or dedicated ticketing application at a ticketing system. The access request may be to view available tickets for a ticketed event, select tickets for a ticketed event, and/or initiate a purchase process for the ticketed event.

At block 204, a request is issued for a decentralized identifier and/or verifiable credential indicating that the user associated with the user device is a human. For example, the request may be issued from the ticketing system (e.g., acting as a verifier system) to a user device. The user device may have the decentralized identifier and/or verifiable credential stored in a digital wallet (e.g., where the wallet is downloaded to, and hosted on the user device).

At block 206, a determination is made as to whether a token (e.g., a one-time use verifiable token signed with the user's/holder's decentralized identifier, tokenizing the verifiable certificate) has been received (e.g., received from the user device at the ticketing system). If the token is received, at block 212, data may be retrieved from a distributed synchronized database (e.g., a blockchain). For example, a DDI token may be stored on a blockchain (however, optionally, an associated verified credential is not stored on the blockchain to further enhance security and privacy). The issuer's public key may be accessed from the blockchain and used to perform decryption and determine if the user's record on the blockchain (which is supposed to be signed using the issuer's private key) is authentic.

At block 214, a determination may be made that if the received token is authentic, that the user is a human (and not an automated program, such as a ticketing bot). If the user is determined to be a human, then at block 216, the user is enabled to proceed with performing the ticket acquisition process.

Optionally, if the token is not authenticated, at block 218, a request may be transmitted to the issuer to revoke the decentralized identifier and/or verifiable credential.

If, at block 206, a determination is made that the token was not received, the user may receive adverse treatment. For example, the user may be required to successfully complete a CAPTCHA and may receive a more negative position in a ticket queue, if one exists. Thus, other users (that did provide their respective tokens and were successfully determined to be human) that requested access after a first user that did not provide the token, may nonetheless be placed ahead of the first user.

Optionally, the humanness determination may be performed using biometric verification without transmitting identity information to the verifier system, while providing a humanness indication to the verifier system (e.g., a ticketing system). For example, when using a ticketing application hosted on a user device that has a biometric reader (e.g., a face authenticator, a fingerprint reader, an iris reader, and/or the like), the application may prompt the person to utilize the user device's biometric reader to authenticate the user. If the user is authenticated by the user device via the biometric reader, an authentication success indication may be provided by the user device to the ticketing application (without actually identifying the user). Such authentication success indication may then be transmitted by the ticketing application to the ticketing system, which may use the authentication success indication as a proof that the user is human. The ticketing system may then enable the user to select and/or purchase tickets. If, on the other hand, the authentication success indication is not received, the user (which may actually be an automated program) may be prevented by the ticketing system from selecting and/or purchasing tickets.

Optionally, in addition or instead, a multifactor technique may be used to determine the humanness of an entity seeking to acquire event tickets. For example, when using a ticketing application or ticketing website, the user may be prompted to provide a mobile phone number. If the mobile phone number is received by the ticketing system (e.g., via the ticketing application or ticketing website), the ticketing system may transmit an alphanumeric code via a messaging service to the mobile phone number. The user may be prompted via the ticketing application, ticketing website, or via a message transmitted to the mobile phone number, to enter the code into a corresponding field presented by the ticketing application or ticketing website. The ticketing system may use the receipt of the code as a proof that the user is human. The ticketing system may then enable the user to select and/or purchase tickets. If, on the other hand, the code is not received, the user (which may actually be an automated program) may be prevented by the ticketing system from selecting and/or purchasing tickets.

Thus, aspects of the present disclosure relate to reliable techniques for determining whether an entity seeking access to resources over a network is a human or an automated program, and to preventing automated programs from accessing resources.

Certain aspects will now be described, where any of the aspects may be used singly or in combination with other aspects.

A first aspect relates to a system, comprising: a network interface; at least one processing device operable to: receive, via the network interface, a request from a remote device for access to an online computer-based service; transmit to the remote device a request for a one-use, cryptographically verifiable token, the cryptographically verifiable token, encoding a verifiable credential comprising a decentralized identifier indicating that a holder of the verifiable credential is human, the verifiable credential containing an issuer's digital signature signed with a private key of the issuer, wherein the verifiable token does not identify the holder; determine whether the requested one-use, cryptographically verifiable token was received from the remote device; at least partly in response to determining that the one-use, cryptographically verifiable token was not received from the remote device inhibit access to the online computer-based service; at least partly in response to determining that the one-use, cryptographically verifiable token was received from the remote device, confirm the validity of the verifiable credential utilizing an associated public key; at least partly in response to confirming the validity of the verifiable credential utilizing the associated public key, determine that the request from the remote device for access to the online computer-based service is from a human; at least partly in response to determining that the request from the remote device for access to the online computer-based service is from a human, enable the remote device to access the online computer-based service.

A second aspect relates to the computer-based service comprising an event ticketing service.

A third aspect relates to wherein the public key is accessed from a blockchain.

A fourth aspect relates to wherein the system is configured to cause an optical code to be displayed on the remote device that periodically refreshes, the optical code encoding a link, wherein in response to an action by the human, the verifiable token is transmitted to a ticketing system.

A fifth aspect relates to wherein the system is configured to cause an optical code to be displayed on the remote device, the optical code encoding a link, wherein in response to an action by the human, the verifiable token is transmitted to a ticketing system.

A sixth aspect relates to wherein the verifiable credential is issued to the human at least partly in response to the human providing accurate responses to questions regarding facts specific to the human.

A seventh aspect relates to wherein the verifiable credential is accessed from a digital wallet.

An eighth aspect relates to wherein the verifiable credential is issued to the human by an issuer authority system associated with a government entity, a credit verification service, or a biometric authentication service.

A ninth aspect relates to wherein the one-use token is a time-limited token configured to expire after a specified period of time.

A tenth aspect relates to a system, comprising: a network interface; at least one processing device operable to: receive, via the network interface, a request from a remote device for access to an online computer-based service; transmit to the remote device a request for a verifiable token, the verifiable token encoding a verifiable credential comprising a decentralized identifier indicating that a holder of the verifiable credential is human, wherein the verifiable token does not identify the holder; determine whether the verifiable token was received from the remote device; at least partly in response to determining that verifiable token was not received from the remote device inhibit access to the online computer-based service; at least partly in response to determining that the verifiable token was received from the remote device, confirm the validity of the verifiable credential; at least partly in response to confirming the validity of the verifiable credential, determine that the request from the remote device for access to the online computer-based service is from a human; at least partly in response to determining that the request from the remote device for access to the online computer-based service is from a human, enable the remote device to access the online computer-based service.

An eleventh aspect relates to computer-implemented method, the method comprising: receiving, at a computer system, a request from a remote device for access to an online computer-based service; transmitting, using the computer system, to the remote device a request for a cryptographically verifiable token, the cryptographically verifiable token, encoding a verifiable credential comprising decentralized identifier indicating that a holder of the verifiable credential is human, the verifiable credential containing an issuer's digital signature signed with a private key of the issuer, wherein the verifiable token does not identify the holder; determining, using the computer system, whether the requested cryptographically verifiable token was received from the remote device; at least partly in response to determining that the cryptographically verifiable token was not received from the remote device, inhibiting, using the computer system, access to the online computer-based service; at least partly in response to determining, using the computer system, that the cryptographically verifiable token was received from the remote device, confirming the validity of the verifiable credential utilizing an associated public key; at least partly in response to confirming the validity of the verifiable credential utilizing, by the computer system, the associated public key, determining that the request from the remote device for access to the online computer-based service is from a human; and at least partly in response to determining that the request from the remote device for access to the online computer-based service is from a human, enabling the remote device to access the online computer-based service.

A twelfth aspect relates to wherein the public key is accessed from a blockchain.

A twelfth aspect relates to causing an optical code to be displayed on the remote device that periodically refreshes, the optical code encoding a link, wherein in response to an action by the human, the verifiable token is transmitted to the computer system.

A thirteenth aspect relates to causing an optical code to be displayed on the remote device, the optical code encoding a link, wherein in response to an action by the human, the verifiable token is transmitted to a ticketing method.

A fourteenth aspect relates to wherein the verifiable credential is issued to the human at least partly in response to the human providing accurate responses to questions regarding facts specific to the human.

A fifteenth aspect relates to wherein the verifiable credential is accessed from a digital wallet.

A sixteenth aspect relates to wherein the verifiable credential is issued to the human by an issuer authority method associated with a government entity, a credit verification service, or a biometric authentication service.

A seventeenth aspect relates to wherein the token is a time-limited token configured to expire after a specified period of time.

An eighteenth aspect relates to wherein the token is a one-time use token valid for a single use with respect to the computer-based service.

A nineteenth aspect relates to non-transitory computer readable memory that stores instructions, that when executed by a computer system comprising one or more computing devices, cause the computer system to perform operations comprising: receive a request from a remote device for access to an online computer-based service; transmit to the remote device a request for a verifiable token, the verifiable token encoding a verifiable credential comprising an identifier indicating that a holder of the verifiable credential is human, the verifiable credential containing an issuer's digital signature signed with a private key of the issuer, wherein the verifiable token does not identify the holder; determine whether the requested verifiable token was received from the remote device; at least partly in response to determining that the verifiable token was not received from the remote device, inhibit access to the online computer-based service; at least partly in response to determining that the verifiable token was received from the remote device, confirm the validity of the verifiable credential utilizing an associated public key; at least partly in response to confirming the validity of the verifiable credential utilizing the associated public key, determine that the request from the remote device for access to the online computer-based service is from a human; at least partly in response to determining that the request from the remote device for access to the online computer-based service is from a human, enable the remote device to access the online computer-based service.

A twentieth aspect relates to wherein the public key is accessed from a blockchain.

A twentieth aspect relates to causing an optical code to be displayed on the remote device that periodically refreshes, the optical code encoding a link, wherein in response to an action by the human, the verifiable token is transmitted to a ticketing system.

A twenty first aspect relates to causing an optical code to be displayed on the remote device, the optical code encoding a link, wherein in response to an action by the human, the verifiable token is transmitted to a ticketing system.

A twenty second aspect relates to wherein the verifiable credential is issued to the human at least partly in response to the human providing accurate responses to questions regarding facts specific to the human.

A twenty third aspect relates to wherein the verifiable credential is accessed from a digital wallet.

A twenty fourth aspect relates to wherein the verifiable credential is issued to the human by an issuer authority system associated with a government entity, a credit verification service, or a biometric authentication service.

A twenty fifth aspect relates to wherein the token is a time-limited token configured to expire after a specified period of time.

A twenty sixth aspect relates to wherein the token is a one-time use token valid for a single use with respect to the computer-based service.

A twenty seventh aspect relates to system, comprising: a network interface; at least one processing device operable to: receive, via the network interface, a request from a remote device for access to an online computer-based service; transmit to the remote device a request for an identity verification utilizing a biometric verification process performed by the remote device; at least partly in response to determining that confirmation that the identity verification was successfully performed has not been received for a user of the remote device, inhibiting access to the computer-based service by the remote device; at least partly in response to determining that confirmation that the identity verification was successfully performed has been received for the user of the remote device, wherein the confirmation does not provide the identity of user, enabling access to the computer-based service by the remote device.

A twenty eighth aspect relates to receiving a request from a remote device for access to an online computer-based service, transmitting to the remote device a request for a verifiable token encoding a verifiable credential containing an issuer's digital signature signed with a private key and an identifier indicating that a holder of the verifiable credential is human. If the verifiable token was not received, access to the online computer-based service is inhibited. If the verifiable token is received, its validity is confirmed utilizing an associated public key. If the validity is confirmed, the request from the remote device for access to the online computer-based service is determined to be from a human and the remote device is enabled to access the online computer-based service.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, other wearable computing device. etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A networked system, comprising:
a first user device;
a second user device;
an access control device;
a ticketing system comprising:
a network interface;
at least one processing device operable to:
present a set of challenge questions to a given user, comprising a first quantity of challenge questions;
determine if the given user correctly answered a threshold number of the challenge questions in the set of challenge questions, wherein the threshold is less than the first quantity of challenge questions;
at least partly in response to determining that the given user answered a threshold number of the challenge questions, issue to the given user a verifiable humanness certificate comprising a decentralized identifier, and enable the certificate to be stored in a digital wallet of the given user, the digital wallet configured to transmit a secure, digital, one use cryptographically verifiable token signed with the given user's decentralized identifier to the ticketing system and configured to be only usable with an online computer-based ticketing service;
receive, via the network interface, a request from the first user device for access to the ticketing system computer resource comprising the online computer-based ticketing service comprising a ticketing acquisition service;
determine whether the first user device accessing the ticketing system computer resource is associated with a human or an automated program by at least:
cause an optical code to be presented on a display of the first user device, the optical code comprising a time stamp, wherein the optical code is configured to cause a notification to be presented on a display of second user device in response to a camera of the second user device imaging the optical code;
in response to an activation of the notification,
transmit, by the second user device, to the ticketing system a public key and the one-use cryptographically verifiable token, comprising a JSON Web token, the one-use cryptographically verifiable token configured to be only usable with the online computer-based ticketing service, encoding a verifiable credential comprising a pairwise-pseudonymous decentralized identifier comprising a namespace component that identifies a decentralized identifier method, a signature comprising a JSON-LD identifier, and a uniform resource identifier that associates the human with the decentralized identifier document enabling trustable interactions associated with the human, the decentralized identifier indicating that a holder of the verifiable credential is human, the verifiable credential configured to be stored off-chain in the digital wallet, containing an issuer's digital signature signed with a private key of the issuer, wherein the one-use cryptographically verifiable token does not identify the holder;
at least partly in response to determining that the one-use cryptographically verifiable token was received from the second user device, confirm a validity of the verifiable credential utilizing the public key, wherein the public key is validated by matching the public key against a public key stored on a general ledger;
at least partly in response to confirming the validity of the verifiable credential utilizing the associated public key, determine that the request from the first user device for access to the online computer-based ticketing service is from the human and not the automated program;
at least partly in response to determining that the request from the first user device for access to the online computer-based ticketing service is from the human and not the automated program, enable the first user device to access the online computer-based ticketing service;
at least partly in response to the human acquiring a first event ticket via the online computer-based ticketing service, associate the first event ticket with the human in a first record; and
at least partly in response to scanning, by the access control device, an authentication code from the second user device associated with the human,
authenticate the human to access a venue.

2. The system as defined in claim 1, wherein the public key is accessed from a blockchain.

3. The system as defined in claim 1, wherein the optical code displayed on the first user device is configured to periodically refresh.

4. The system as defined in claim 1, wherein the access code is encoded in a QR optical code displayed by the second user device.

5. The system as defined in claim 1, wherein the verifiable credential is issued to the human at least partly in response to the human providing accurate responses to textual questions regarding facts specific to the human.

6. The system as defined in claim 1, wherein the verifiable credential is bound to a unique digital wallet identifier of the digital wallet signed using a private key and/or a PIN code to thereby inhibit a use of the verifiable credential with a different digital wallet.

7. The system as defined in claim 1, wherein the verifiable credential is revocable.

8. The system as defined in claim 1, wherein the one-use cryptographically verifiable token is a time-limited token configured to expire after a specified period of time.

9. A computer-implemented method, the method comprising:
presenting, using a computer system, a set of challenge questions to a given user, comprising a first quantity of challenge questions;
determining, by the computer system, if the given user correctly answered a threshold number of the challenge questions in the set of challenge questions, wherein the threshold is less than the first quantity of challenge questions
at least partly in response to determining that the given user answered a threshold number of the challenge questions, issuing to the given user a verifiable humanness certificate comprising a decentralized identifier, and enable the certificate to be stored in a digital wallet of the given user, the digital wallet configured to transmit a secure, digital, one use cryptographically verifiable token signed with the given the user's decentralized identifier to the computer system and configured to be only usable with an online computer-based ticketing service;

receiving, at the computer system, a request from a first user device for access to the computer system computer resource comprising the online computer-based ticketing service;

causing an optical code to be presented on a display of the first user device, the optical code comprising a time stamp, wherein the optical code is configured to cause a notification to be presented on a display of second user device in response to a camera of the second user device imaging the optical code;

in response to an activation of the notification,
transmitting, by the second user device, to the computer system a public key and the one-use cryptographically verifiable token, comprising a JSON Web token, the one-use cryptographically verifiable token configured to be only usable with the online computer-based ticketing service, encoding a verifiable credential comprising a pairwise-pseudonymous decentralized identifier comprising a namespace component that identifies a decentralized identifier method and a uniform resource identifier that associates the human with the decentralized identifier document enabling trustable interactions associated with the human, the decentralized identifier indicating that a holder of the verifiable credential is human, the verifiable credential configured to be stored off-chain in the digital wallet, containing an issuer's digital signature signed with a private key of the issuer, wherein the one-use cryptographically verifiable token does not identify the holder;

at least partly in response to determining that the one-use cryptographically verifiable token was received from the second user device, confirming, using the computer system, a validity of the verifiable credential utilizing the public key, wherein the public key is validated by matching the public key against a public key stored on a general ledger;

at least partly in response to confirming the validity of the verifiable credential utilizing the associated public key, determining that the request from the first user device for access to the online computer-based ticketing service is from the human and not an automated program;

at least partly in response to determining that the request from the first user device for access to the online computer-based ticketing service is from the human and not the automated program, enabling the first user device to access the online computer-based ticketing service;

at least partly in response to the human acquiring a first event ticket via the online computer-based ticketing service, associating the first event ticket with the human in a first record; and at least partly in response to scanning, by an access control device, an authentication code from the second user device associated with the human, authenticate the human to access a venue.

10. The method as defined in claim 9,
wherein the public key is accessed from a blockchain.

11. The method as defined in claim 9, wherein the optical code displayed on the first user device is configured to periodically refresh.

12. The method as defined in claim 9, wherein the optical code comprises a two dimensional optical code.

13. The method as defined in claim 9, wherein the verifiable credential is issued to the human at least partly in response to the human providing accurate responses to textual questions regarding facts specific to the human.

14. The method as defined in claim 9, wherein the verifiable credential is bound to a unique digital wallet identifier of the digital wallet signed using a private key and/or a PIN code to thereby inhibit a use of the verifiable credential with a different digital wallet.

15. The method as defined in claim 9, wherein the verifiable credential is revocable.

16. The method as defined in claim 9, wherein the one-use cryptographically verifiable token is a time-limited token configured to expire after a specified period of time.

17. The method as defined in claim 9, wherein the digital wallet is included in a ticketing application downloaded to a computer device associated with the given user.

\* \* \* \* \*

UNITED STATES PATENT AND TRADEMARK OFFICE
CERTIFICATE OF CORRECTION

PATENT NO. : 12,293,372 B2
APPLICATION NO. : 18/475158
DATED : May 6, 2025
INVENTOR(S) : Michael J. Rojas Page 1 of 1

It is certified that error appears in the above-identified patent and that said Letters Patent is hereby corrected as shown below:

In the Specification

Under Column no. 8, Line no. 9, replace "the like)" with "the like).".

Under Column no. 8, Line no. 40, replace "spotted her By" with "spotted her. By".

Under Column no. 10, Line no. 10 (Approx.), replace "tokenized credential al and/or" with "tokenized credential and/or".

In the Claims

Under Column no. 21, Claim 9, Line no. 23, replace "identifies a decentralized" with "that identifies the decentralized".

Signed and Sealed this
Seventeenth Day of June, 2025

Coke Morgan Stewart
*Acting Director of the United States Patent and Trademark Office*